US012320398B2

(12) United States Patent
Bahmata

(10) Patent No.: US 12,320,398 B2
(45) Date of Patent: Jun. 3, 2025

(54) BRAKE SYSTEM WITH TORQUE LIMITER ASSEMBLY

(71) Applicant: AKEBONO BRAKE INDUSTRY CO., LTD., Tokyo (JP)

(72) Inventor: Aurelian Bahmata, South Lyon, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 375 days.

(21) Appl. No.: 17/878,518

(22) Filed: Aug. 1, 2022

(65) Prior Publication Data

US 2024/0035532 A1 Feb. 1, 2024

(51) Int. Cl.
*F16D 65/18* (2006.01)
*F16D 7/08* (2006.01)
(Continued)

(52) U.S. Cl.
CPC .............. *F16D 65/18* (2013.01); *F16D 7/08* (2013.01); *F16D 55/226* (2013.01);
(Continued)

(58) Field of Classification Search
CPC .......... F16D 65/18; F16D 7/08; F16D 55/226; F16D 2121/24; F16D 2125/40; F16D 2125/50; F16D 2125/582
(Continued)

(56) References Cited

U.S. PATENT DOCUMENTS 3,754,412 A * 8/1973 Briggs ...................... F16D 7/08
192/56.62
4,043,437 A * 8/1977 Taylor ..................... F16D 7/048
188/218 XL
(Continued)

FOREIGN PATENT DOCUMENTS

DE 102004006801 A1 8/2004
DE 102004048700 A1 5/2006
(Continued)

OTHER PUBLICATIONS

International Search Report & Written Opinion, PCT Application No. PCT/IB2023/057428 dated Oct. 26, 2023.

*Primary Examiner* — Christopher P Schwartz
(74) *Attorney, Agent, or Firm* — The Dobrusin Law Firm, P.C.

(57) ABSTRACT

A brake system comprising a torque limiter assembly that sets a torque limit and associated with an electromechanical actuation system. The torque limiter assembly comprises a ring gear meshed with two or more planetary gears, the ring gear comprising a first race extending circumferentially therearound. The torque limiter assembly comprises a preloaded member comprising a second race extending circumferentially therearound. Balls are engaged between the first and second races. The first and/or second races comprise a series of peaks and valleys, and slopes extending therebetween. Below the torque limit, the balls are engaged within the valleys causing the ring gear to remain rotationally (Continued)

captive and the planetary gears to orbit. At and above the torque limit, the balls slip over the peaks, causing the ring gear to rotate and the planetary gears to remain orbitally captive.

19 Claims, 5 Drawing Sheets

(51) Int. Cl.
    *F16D 55/226*    (2006.01)
    *F16D 121/24*    (2012.01)
    *F16D 125/40*    (2012.01)
    *F16D 125/50*    (2012.01)
    *F16D 125/58*    (2012.01)

(52) U.S. Cl.
    CPC ...... *F16D 2121/24* (2013.01); *F16D 2125/40* (2013.01); *F16D 2125/50* (2013.01); *F16D 2125/582* (2013.01)

(58) Field of Classification Search
    USPC .................................................. 188/72.7, 72.8
    See application file for complete search history.

(56) References Cited

U.S. PATENT DOCUMENTS

| | | | |
|---|---|---|---|
| 4,046,237 A * | 9/1977 | Root | F16D 67/02 |
| | | | 188/218 XL |
| 7,143,888 B2 | 12/2006 | Lang | |
| 8,893,862 B2 | 11/2014 | Malki et al. | |
| 9,879,739 B2 | 1/2018 | Gutelius et al. | |
| 10,066,692 B2 | 9/2018 | Sandberg | |
| 10,221,908 B2 | 3/2019 | Henning et al. | |
| 10,843,674 B2 | 11/2020 | Severinsson | |
| 11,193,547 B2 | 12/2021 | Gerber et al. | |
| 11,261,928 B2 | 3/2022 | Taylor et al. | |
| 2016/0032993 A1 | 2/2016 | Takei | |
| 2020/0096067 A1* | 3/2020 | Boyle | F16D 65/0971 |
| 2021/0001826 A1* | 1/2021 | Gerber | B60T 13/741 |

FOREIGN PATENT DOCUMENTS

| | | |
|---|---|---|
| DE | 102011004804 A1 | 8/2012 |
| DE | 102019203605 A1 | 9/2020 |
| EP | 2308729 B1 | 4/2011 |
| FR | 2931766 A1 | 12/2009 |
| FR | 3038677 A1 | 1/2017 |
| GB | 2120332 A | 11/1983 |
| KR | 101808397 B1 | 12/2017 |
| WO | 2006111136 A1 | 10/2006 |
| WO | 2012172317 A1 | 12/2012 |

* cited by examiner

BRAKE SYSTEM WITH TORQUE LIMITER ASSEMBLY

FIELD

The present disclosure relates to a torque limiter assembly operable with a brake system. The torque limiter assembly is associated with an electromechanical actuation system.

BACKGROUND

Brake systems typically operate with two or more pistons acting upon a brake pad to apply it into or release it from engagement with a rotor. The pistons generally act in unison to apply symmetrical pressure to the rotor. In some circumstances, one piston must travel a longer distance than another piston acting on the same brake pad. Thus, torque applied to the pistons in an "apply" or "release" operation must be applied asymmetrically until symmetric pressure is applied to the brake pad. If symmetrical pressure is not applied to the brake pad, insufficient braking force and uneven wear of the brake pad's friction material can result.

One solution to asymmetric piston travel is to employ a limited slip differential, such as described in U.S. Pat. No. 9,879,739 B2. This solution requires package space, complex metal parts, and accurate manufacturing and assembly methods in order to operate consistently. Moreover, small variations in slip torque between different pistons can generate excess load on one or more of the pistons.

There is a need for actuating piston assemblies asymmetrically.

There is a need for fitting a mechanism for actuating piston assemblies asymmetrically within a smaller packaging space compared to the packaging space of limited slip differential systems.

There is a need to address asymmetric piston assembly actuation with solutions that require less parts compared to the complexity of limited slip differential systems.

There is a need to address asymmetric piston assembly actuation with comparatively less complex manufacturing and assembly methods relative to limited slip differential systems.

SUMMARY

The present disclosure provides for a brake system, which may address at least some of the needs identified above. The brake system may comprise an electromechanical actuation system. The electromechanical actuation system may comprise a first portion and a second portion. Each portion may comprise a torque limiter assembly. The torque limiter assemblies may set a torque limit.

Each torque limiter assembly may comprise a planetary gear, a ring gear, a pre-loaded member, and balls. The planetary gear may mesh with a sun gear. The ring gear may mesh with the planetary gear. The ring gear may comprise a first race extending circumferentially therearound. The pre-loaded member may comprise a second race extending circumferentially therearound. The balls may be engaged between the first race and the second race.

The first race and/or the second race may comprise a series of peaks and valleys, and slopes extending therebetween.

Below the torque limit, the balls may be engaged within the valleys causing the ring gear to remain rotationally captive and the planetary gear to orbit around the sun gear.

At and above the torque limit, the balls may slip over the peaks, causing the ring gear to rotate and the planetary gear to remain orbitally captive.

An angle of the slopes may determine the torque limit, at least in part. The angle of the slopes may be between about 5° and about 45°.

The angle of the slopes over which the balls travel in the release direction may be the same as or different from the angle of the slopes over which the balls travel in the apply direction.

The angle of the slopes over which the balls travel in the release direction may be between about 2% and 25% greater than the angle of the slopes over which the balls travel in the apply direction.

The torque limiter assembly may comprise a spring. The spring may generally circumferentially align with the first and second races. The spring may apply a force upon the pre-loaded member such that the balls are compressed between the pre-loaded member and the ring gear.

The height of the peaks, measured from the valleys, may determine the torque limit. The height of the peaks may determine how much the spring is compressed.

The force applied upon the pre-loaded member may determine the torque limit, at least in part.

The peaks, valleys, and slopes may be defined by an undulating surface, jagged surface, or both.

Each portion of the electromechanical actuation system may comprise a first plate carrier and/or a second plate carrier. The first plate carrier may engage a first side of the planetary gear such that orbit of the planetary gear causes the first plate carrier to rotate. The second plate carrier may engage a second side of the planetary gear such that orbit of the planetary gear causes the first plate carrier to rotate. The second side may oppose the first side.

The first or second plate carrier may comprise an output shaft that mechanically cooperates with a spindle. The spindle may cooperate with a nut as a ball screw mechanism. The nut may engage a piston.

Rotation of the spindle may ultimately cause the piston to axially translate in an apply direction and/or a release direction.

The torque limit of the first portion may be different from the torque limit of the second portion.

Both the first and second portions of the electromechanical actuation system may be actuated by the same motor.

The brake system may comprise a caliper. The caliper may comprise an inner body portion and an outer body portion. A bridge may extend between the inner body portion and the outer body portion. The bridge may comprise one or more fingers that act upon a brake pad associated with the outer body portion.

The brake system may comprise two or more pistons located entirely on the inner body portion or the outer body portion, or located on both the inner body portion and the outer body portion. Each of the first and second portions of the electromechanical actuation system may be associated with each of the two or more pistons.

Each portion of the electromechanical actuation system may symmetrically act upon the two or more pistons until resistance against at least one of the pistons causes the torque limit to be realized. At which time, the electromechanical actuation system may asymmetrically act upon the two or more pistons due to rotational freedom of the ring gear The present disclosure provides for an electromechanical actuation system, which may address at least some of the needs identified above. The electromechanical actuation system may be for a vehicle brake. The electromechanical actuation system may comprise a nut and a spindle. Rotation of the spindle may actuate the nut in an apply direction and/or a release direction. The electromechanical actuation system may comprise a motor. The motor may mechanically communicate with the spindle.

The electromechanical actuation system may comprise a torque limiter assembly. The torque limiter assembly may be disposed mechanically downstream of the motor and mechanically upstream of the spindle. The torque limiter assembly may be set to a torque limit. Below the torque limit, rotational movement may be delivered to the spindle. Above the torque limit no rotational movement may be delivered to the spindle.

The torque limiter assembly may be a ball-detent type torque limiter.

The torque limiter assembly may comprise a planetary gear, a sun gear, and a ring gear. The planetary gear may be meshed with both the sun gear and the ring gear. Below the torque limit, the ring gear may remain rotationally captive and the planetary gear may orbit around the sun gear. At and above the torque limit, the ring gear may rotate and the planetary gear may remain orbitally captive.

The ring gear may comprise a race having a series of peaks and valleys, and slopes extending therebetween. The electromechanical actuation system may comprise balls engaged with the race. Below the torque limit, the balls may be engaged within the valleys. At and above the torque limit, the balls may slip over the peaks.

The electromechanical actuation system may comprise two or more portions. Each portion may be associated with a separate piston for engaging a brake pad. Each portion may be provided with the torque limiter assembly.

DETAILED DESCRIPTION

Figure 1A:
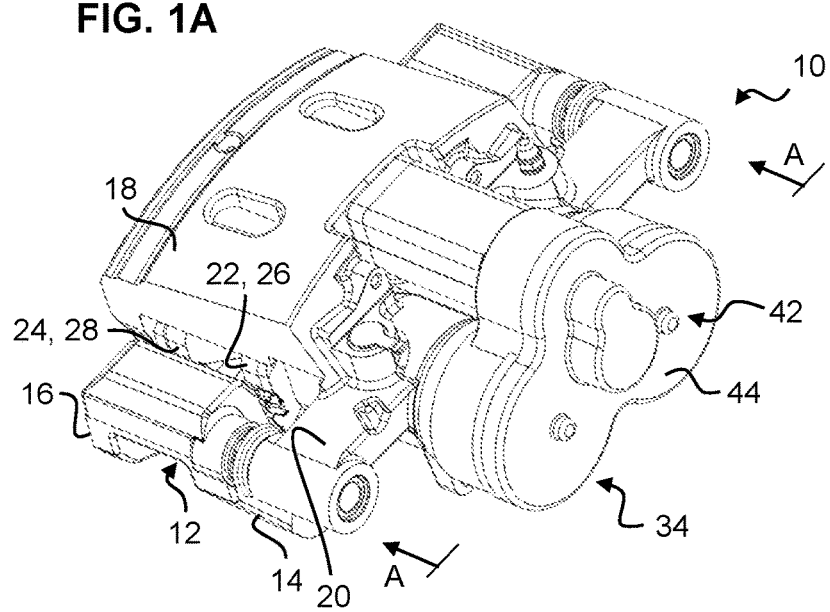
FIG. 1A is a perspective view of a brake system according to the present teachings.
Figure 1B:
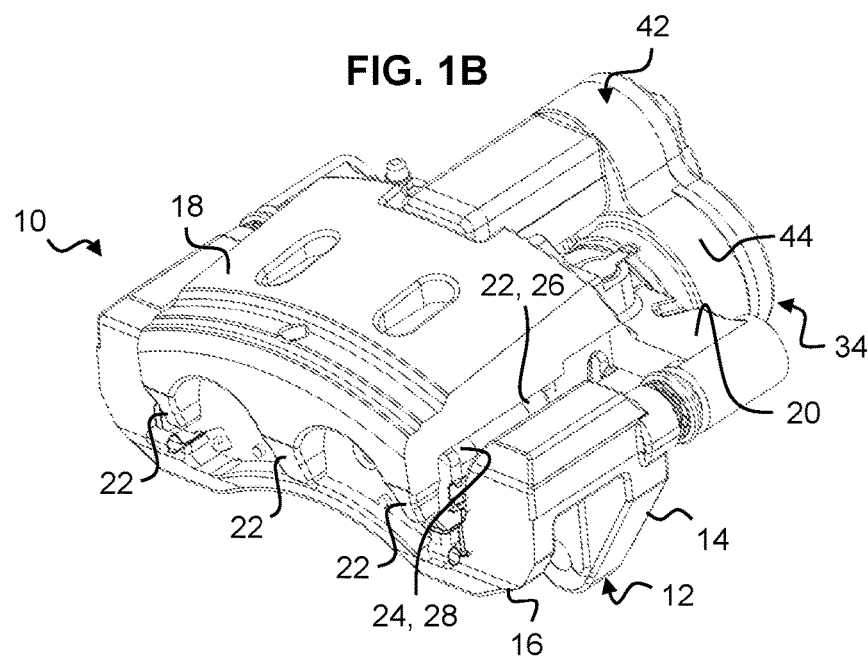
FIG. 1B is a perspective view of a brake system according to the present teachings.
Figure 1C:
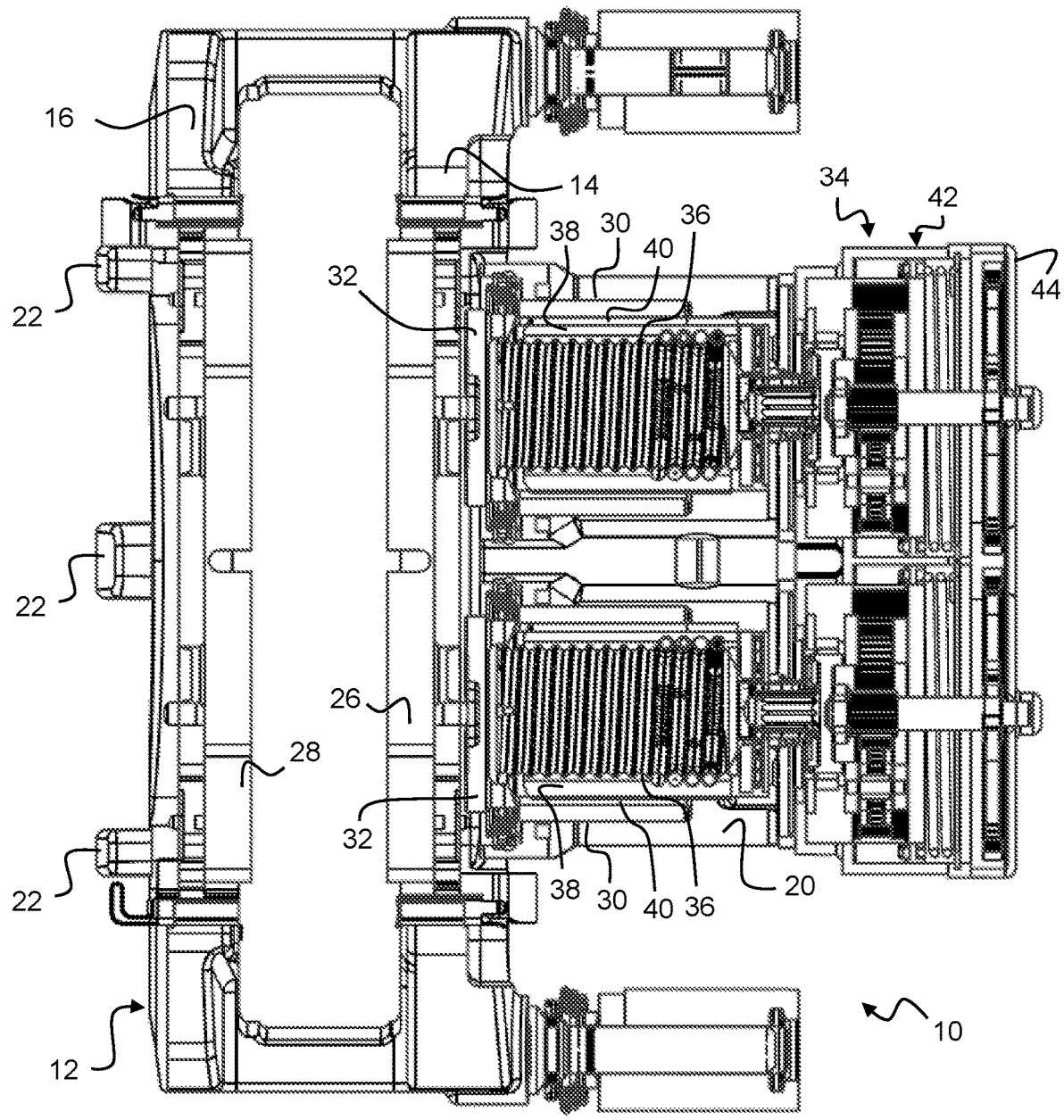
FIG. 1C is a sectional view of the brake system illustrated in FIG. 1A, along line A-A.

FIGS. 1A-1C illustrate a brake system 10. The brake system 10 comprises a caliper 12 including an inner body portion 14 and an outer body portion 16. Extending over the caliper 12 is a bridge portion 18 that extends from a main body portion 20. Extending from the bridge portion 18 are three fingers 22 located proximate to the outer body portion 16, although any quantity of fingers 22 are contemplated by the present teachings. Preferably, at least two fingers 22 are employed such that two opposing ends of a brake pad are acted upon. The brake system 10 comprises a pair of brake pads 24 including an inner brake pad 26 and an outer brake pad 28. The inner body portion 14 and the inner brake pad 26 locate inboard of a rotor. The outer body portion 16 and the outer brake pad 28 locate outboard of the rotor. Illustrated is a floating caliper design, however, the present teachings may also find application in fixed caliper designs.

As illustrated in FIG. 1C, the brake system 10 comprises two cylinders 30 defined in the main body portion 20 with associated pistons 32 located therein and extending therefrom. The pistons 32 move within the cylinders 30 in apply and release directions. The pistons 32 act upon the inner brake pad 26. The present teachings contemplate that one or more cylinders 30 and associated pistons 32 can be located proximate to either or both of the inner body portion 14 and the outer body portion 16. Actuation of the pistons 32 with respect to the inner brake pad 26 causes the fingers 22 to act upon the outer brake pad 28. This is possible due to the main body portion 20 and attached bridge portion 18 being slidably fastened to the caliper 12, providing for movement of the bridge portion 18 relative to the caliper 12. Specifically, in an apply operation, a load is applied to the pistons 32 by either or both of an electromechanical actuation system 34 and a hydraulic actuation system. Thus, the pistons 32 are caused to exert a load upon the inner brake pad 26, which in turn exerts a load upon a rotor. Then, in reaction to the load exerted by the pistons 32, the bridge portion 18 and fingers 22 are shifted axially inboard relative to the caliper 12, whereby the fingers 22 press the outer brake pad 28 against the rotor. Thus, loads are applied to opposing sides of a rotor to cause braking.

The brake system 10 of the present teachings comprises at least an electromechanical actuation system 34 and optionally a hydraulic actuation system. The torque limiter assembly of the present teachings is associated with the electromechanical actuation system 34. The electromechanical actuation system 34 and/or the hydraulic actuation system act upon the pistons 32 to cause the pistons 32 to move within the cylinders 30. Specifically, the electromechanical actuation system 34 causes spindles 36 to rotate while remaining axially captive to move nuts 38 axially toward and away from the inner brake pad 26, the nuts 38 engaging and causing movement of the pistons 32. The hydraulic actuation system causes a fluid 40 residing in the cylinders 30 to apply and release a hydraulic pressure upon the piston 32. The electromechanical actuation system 34 and the hydraulic actuation system can work individually and/or cooperation with one another during apply and release operations. Typically, the electromechanical actuation system 34 operates a parking brake and the hydraulic actuation system operates a service brake, although other arrangements are contemplated by the present teachings.

The electromechanical actuation system 34 comprises a motor gear unit 42, which is coupled to the main body portion 20 of the brake system 10. The motor gear unit 42 comprises a motor gear unit housing 44 that covers and protects the internal mechanism of the motor gear unit 42.

Figure 2A:
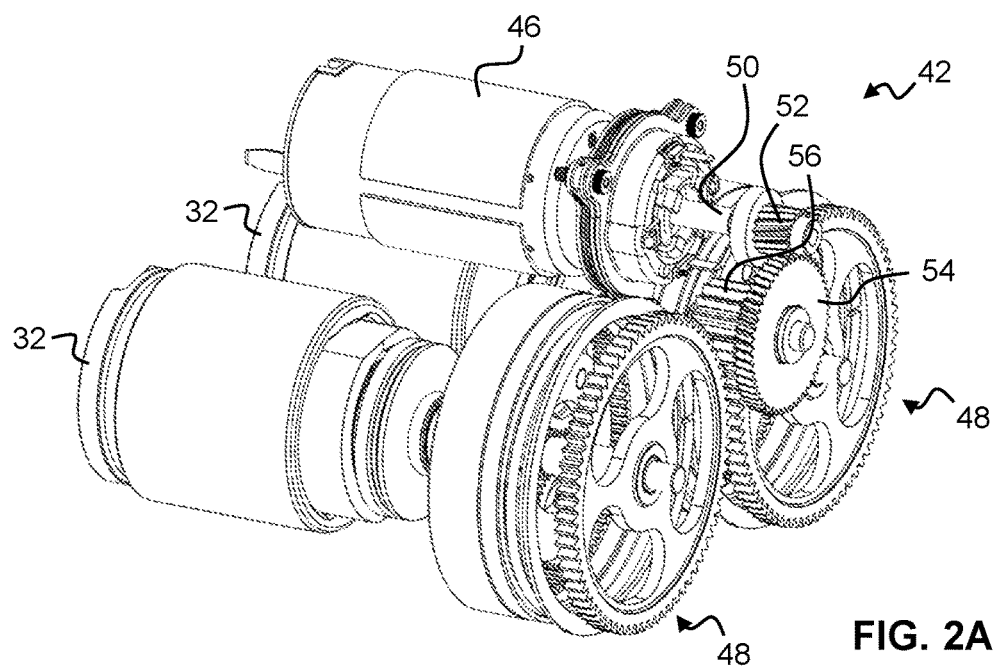
FIG. 2A is a perspective view of a motor gear unit and pistons according to the present teachings.
Figure 2B:
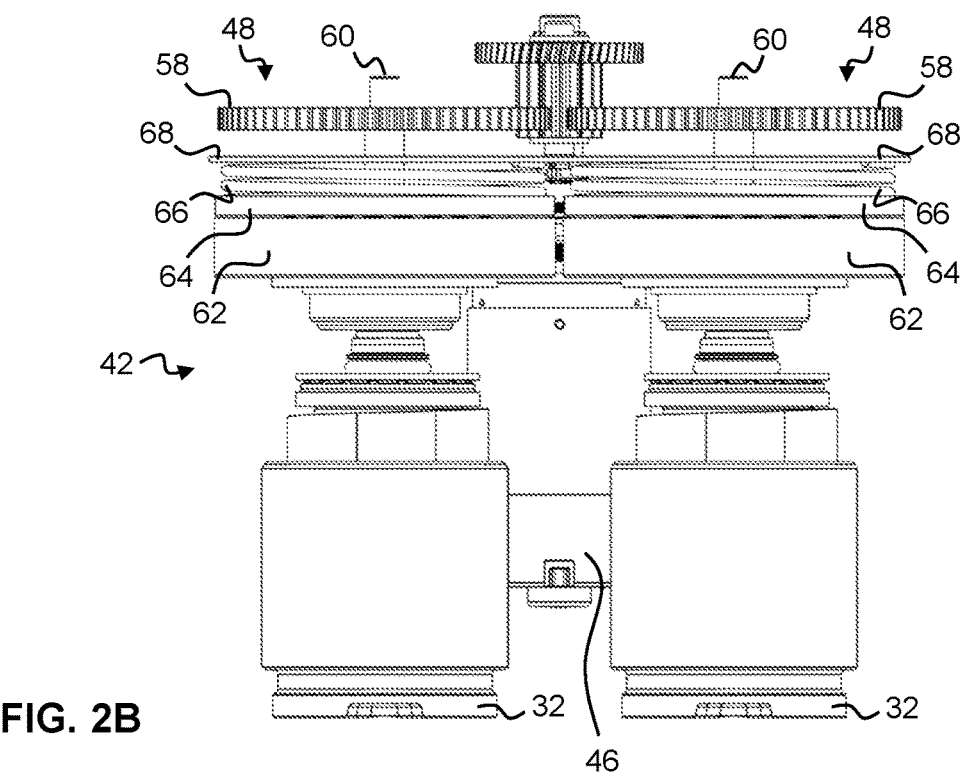
FIG. 2B is a plan view of a motor gear unit and pistons according to the present teachings.

FIG. 2A and FIG. 2B illustrate a motor gear unit 42 with the motor gear unit housing 44, illustrated in FIGS. 1A-1C, removed. The motor gear unit 42 comprises a motor 46 and two torque limiter assemblies 48. One torque limiter assembly 48 or even three or more torque limiter assemblies 48 are contemplated by the present teachings. Generally, one torque limiter assembly 48 is associated with each individual piston 32. The motor 46 comprises a motor drive shaft 50 including a motor drive gear 52, which acts upon a helical gear 54, and the helical gear 54 shares a common shaft with a pinion gear 56. Torque is transferred from the motor drive shaft 50 to the torque limiter assemblies 48 via the motor drive gear 52, the helical gear 54, and the pinion gear 56.

The present disclosure contemplates that any number of linkages (e.g., gears) between the motor drive shaft 50 and the torque limiter assemblies 48 may be employed. By way of example, the motor drive shaft 50 may be splined and engage directly with the torque limiter assemblies 48. The quantity and arrangement of linkages may be directed by the desired packaging space of the components of the brake system 10. As illustrated in FIG. 2A and FIG. 2B, the helical gear and pinion gear 56 provide for the motor 46 to be packaged above the cylinders 30 illustrated in FIG. 1C.

FIG. 2B provides an alternative view of the motor gear unit 42 depicted in FIG. 2A. Each torque limiter assembly 48 comprises a torque limiter drive gear 58 coupled to a torque limiter drive shaft 60. Each torque limiter assembly 48 comprises a ring gear 62 that cooperates with planetary gears 70 driven by a sun gear 72, shown in FIG. 3A, the sun gear 72 being associated with the torque limiter drive shaft 60. The ring gear 62 engages balls 84, shown in FIG. 3A, sandwiched between the ring gear 62 and a first side of a pre-loaded member 64. A spring 66 engages the pre-loaded member 64 on an opposing second side thereof. The spring 66 is held into engagement with the pre-loaded member 64 by a spring retainer 68. The spring retainer 68 is coupled to the interior surface of the motor gear unit housing 44 shown in FIGS. 1A-1C and extends therefrom to provide a surface for the spring 66 to engage.

Figure 3A:
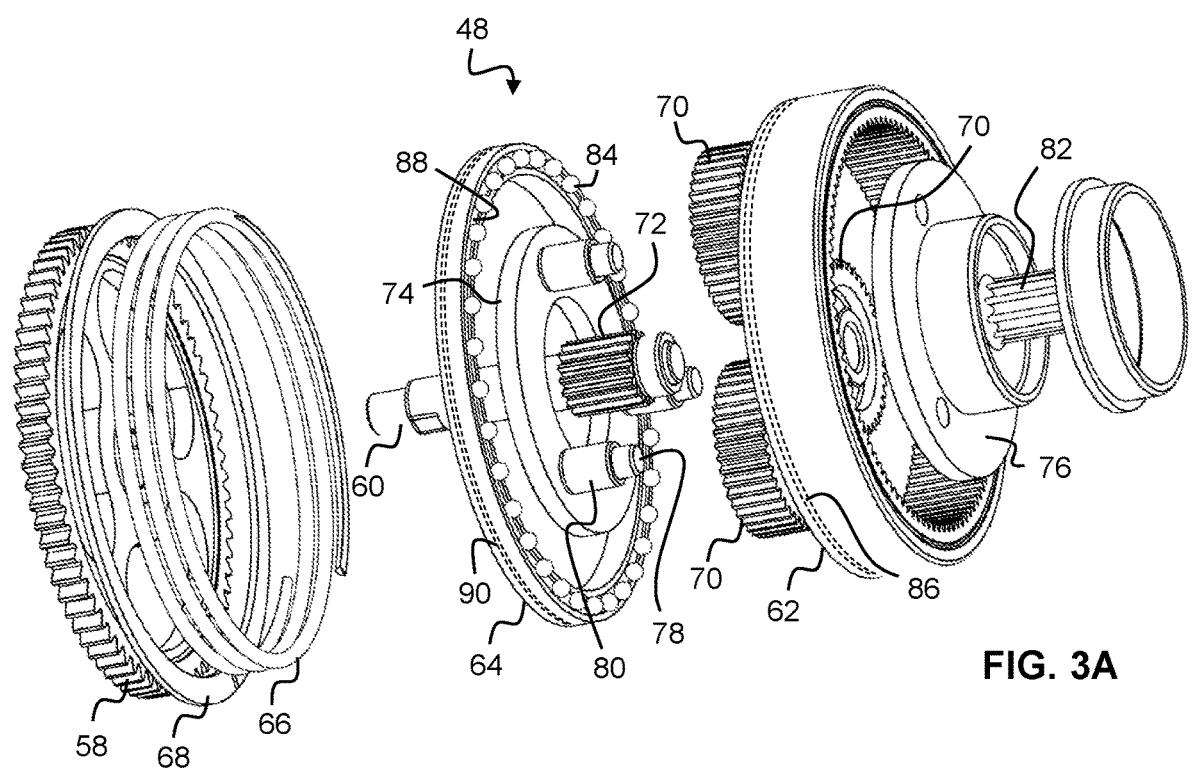
FIG. 3A is an exploded view of a torque limiter assembly according to the present teachings.

FIG. 3A illustrates a torque limiter assembly 48. The torque limiter assembly 48 comprises a ring gear 62 that cooperates with three planetary gears 70 driven by a sun gear 72. The sun gear 72 is in the form of splines on the torque limiter drive shaft 60. The sun gear 72 can be integrally formed to the torque limiter drive shaft 60 (e.g., by casting and/or machining) or fastened thereto (e.g., by a keyed engagement). The sun gear 72 actuates the planetary gears 70 relative to the ring gear 62. Depicted are three planetary gears although the present teachings contemplate a lesser or greater quantity of planetary gears 70.

The planetary gears 70 are fixed between a first plate carrier 74 and a second plate carrier 76. The first plate carrier 74 comprises three shafts 78 extending therefrom, the shafts 78 being provided bushings to facilitate rotation of the planetary gears 70. The present teachings contemplate that the shafts 78 extend from either or both of the first plate carrier 74 and the second plate carrier 76. The second plate carrier 76 comprises an output shaft 82.

The ring gear 62 engages balls 84 sandwiched between the ring gear 62 and a first side of a pre-loaded member 64. A spring 66 engages the pre-loaded member 64 on an opposing second side thereof. The spring 66 is held into engagement with the pre-loaded member 64 by a spring retainer 68. The spring retainer 68 is located proximate to the torque limiter drive gear 58.

The ring gear 62 comprises a first race 86 extending circumferentially around the ring gear 62. Adjacent to the ring gear 62 is disposed the pre-loaded member 64 comprising a second race 88 in opposing relationship to the first race 86.

The pre-loaded member 64 comprises a groove 90 opposing the second race 88. A first end of the spring 66 locates within the groove 90. A second end of the spring 66, opposing the first end, abuts the spring retainer 68.

Figure 3B:
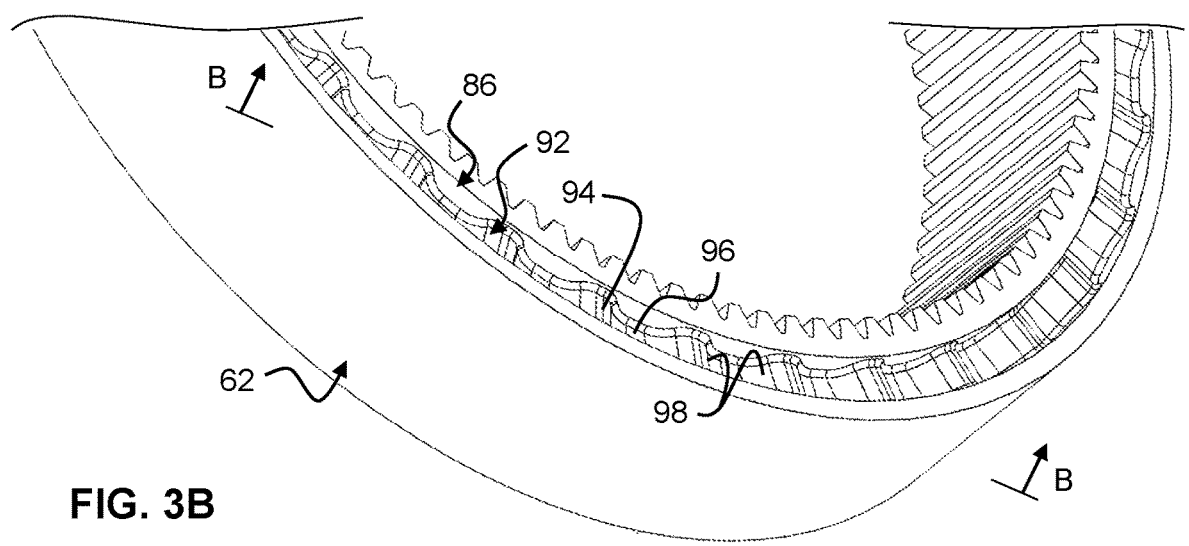
FIG. 3B is a perspective view of a ring gear according to the present teachings.
Figure 3C:
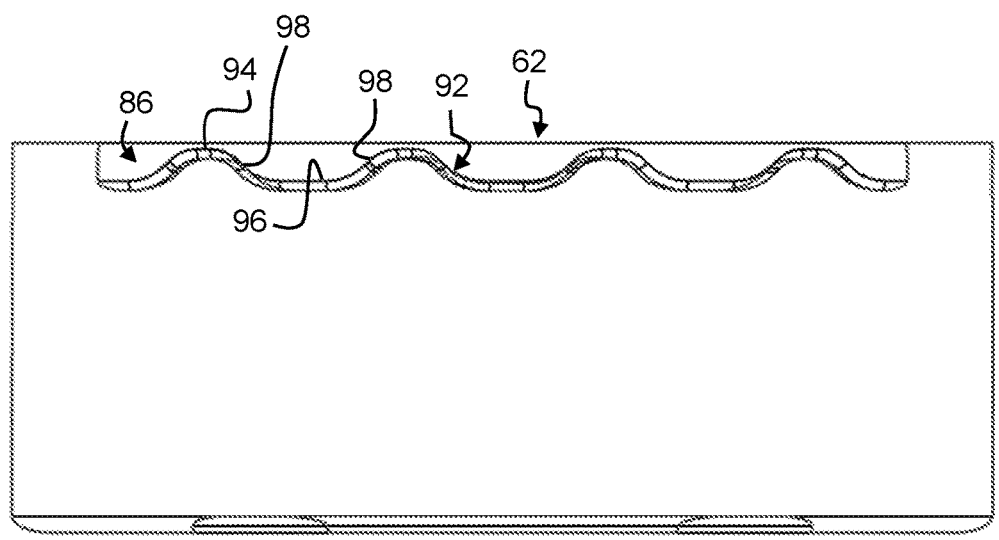
FIG. 3C is a sectional view of the ring gear illustrated in FIG. 3B, along line B-B.

As shown in FIG. 3B and FIG. 3C, the first race 86 of the ring gear 62 comprises an undulating surface 92. The present disclosure contemplates that the second race 88 associated with the pre-loaded member 64 can comprise the undulating surface 92 in addition or alternative to the first race 86. The undulating surface 92 comprises a series of peaks 94 and valleys 96, and slopes 98 extending therebetween. Locatable between and within the first race 86 and the second race 88 are a plurality of balls 84, shown in FIG. 3A. There may be a corresponding quantity of balls 84 to the quantity of valleys 96, or even a lesser quantity of balls relative to the quantity of valleys 96.

Turning back to FIG. 3A, the spring 66 applies force to the pre-loaded member 64, thus retaining the balls 84 in the valleys 96. As discussed herein, the pre-load of the spring 66, angle of the slopes 98, number of the balls 84, the dimension (e.g., diameter) of the balls 84, the height of the peaks 94, measured from the valleys 96, or any combination thereof may define a torque limit required for the balls 84 to slip over the peaks 94 of the undulating surface 92. Other configurations for defining the torque limit may be appreciated by the present teachings.

Below the torque limit, engagement of the balls 84 in the valleys 96 affixes the position of the ring gear 62 and prevents the same from rotation. In this configuration, the planetary gears 70 orbit around the sun gear 72. At and above the torque limit, the balls 84 slip over the peaks 94 and the ring gear 62 is caused to rotate. In this configuration, the planetary gears 70 rotate on their respective shafts 78, however they do not orbit the sun gear 72. Rather than the planetary gears orbiting the sun gear 72, the ring gear 62 orbits the sun gear 72.

The present teachings provide for a torque limiter assembly operable with a brake system. The torque limiter assembly may be associated with an electromechanical actuation system. That is, the torque limiter assembly may be integrated into the mechanical drive mechanism of the electromechanical actuation system.

The brake system may comprise an electromechanical actuation system. The electromechanical actuation system may employ a motor to ultimately causes movement of one or more pistons in an apply direction and/or a release direction.

The electromechanical actuation system may be associated with a service brake operation and/or a parking brake operation. Preferably, the electromechanical actuation system may be associated with a parking brake operation.

The electromechanical actuation system may comprise one or more torque limiter assemblies. The torque limiter assembly may be located mechanically downstream of a motor and mechanically upstream of a piston.

One torque limiter assembly may be provided for each piston, although the present teachings contemplate that one torque limiter assembly may be associated with multiple pistons.

The brake system may comprise a hydraulic actuation system. The hydraulic actuation system may comprise a fluid that applies a pressure upon one or more pistons. The fluid may be disposed within a cylinder in which the piston is housed.

The hydraulic actuation system may be associated with a service brake operation and/or a parking brake operation. Preferably, the hydraulic actuation system may be associated with the service brake operation.

The electromechanical and hydraulic actuation systems may act individually and/or in cooperation to move a piston in an apply operation and/or a release operation. In the apply operation, the piston may be moved toward a rotor and thus influence movement of one or more brake pads toward and/or into engagement with the rotor. In a release operation, the piston may be moved away from the rotor and thus influence movement of one or more brake pads away from and/or out of engagement from the rotor.

The brake system may comprise a caliper. The caliper may function to house at least a portion of an electromechanical actuator system and/or a hydraulic actuator system, provide mounting points for brake pads, position brake pads relative to a rotor, or any combination thereof. In this regard, the caliper may have an inner body portion and an outer body portion. The inner body portion may locate inboard of a rotor. The outer body portion may locate outboard of the rotor.

The caliper may be a floating caliper. That is, the caliper may be structurally separate from the electromechanical and/or hydraulic actuation systems. The electromechanical and/or hydraulic actuation systems may fasten to the caliper. While fastened, the electromechanical and/or hydraulic actuation systems may slide relative to the caliper.

The caliper may be a fixed caliper. That is, the caliper may be structurally integral with the electromechanical and/or hydraulic actuation systems. The electromechanical and/or hydraulic actuation systems may remain fixed relative to the caliper.

The caliper may comprise both floating and fixed portions.

The brake system may comprise one or more brake pads. The brake pads may function to frictionally engage a rotor. The brake pads may engage a rotor and cause the rotor and/or the vehicle on which the rotor is employed to slow and/or stop. That is, rotational movement of the rotor may be slowed and/or stopped, and linear movement of the vehicle may be slowed and/or stopped.

The brake pads may be fastened to the caliper, such as with clips. The brake pads may engage with and be moved by one or more pistons. Preferably, opposing ends of the brake pads may be symmetrically acted upon by pistons. In this regard, the entire surface area or at least a substantial portion of the surface area of friction material on the brake pad is caused to engage a rotor. Thus, uneven wear on the brake pads may be avoided or at least mitigated, and the full intended braking load is achieved.

A pair of brake pads may be employed. The brake pads may include an inner brake pad that locates onto the inner body portion of the caliper, and an outer brake pad that locates onto the outer body portion of the caliper. The inner and outer brake pads may clamp the rotor.

The caliper may comprise one or more cylinders. The cylinders may function to house pistons, fluid of a hydraulic actuation system, components of an electromechanical actuation system, or any combination thereof. The cylinders may be formed in the caliper such as by casting, machining, or both.

The brake system may comprise one or more pistons. The pistons may function to cooperate with a hydraulic actuation system and/or an electromechanical actuation system to be caused to engage and apply a load upon brake pads. One or more components of an electromechanical actuation system (e.g., a nut and spindle) and/or fluid located within the cylinders may cause the pistons to move within the cylinder.

The pistons may be located within the cylinders. The pistons may move within the cylinders. The pistons may comprise a portion that extends outside of the cylinders. The portion extending outside of the cylinders may engage a brake pad.

One or more cylinders and associated pistons may be located in or proximate to the inner body portion. These may be referred to herein as inboard cylinders and inboard pistons. One or more cylinders and associated pistons may be located in or proximate to the outer body portion. These may be referred to herein as outboard cylinders and outboard pistons. One or more cylinders and associated pistons may be located in or proximate to both the inner body portion and the outer body portion. Preferably, the cylinders and associated pistons are located in or proximate to at least the inner body portion.

Inboard cylinders and associated pistons may be coaxial with outboard cylinders and associated pistons. In this regard, clamping force applied by opposing inboard and outboard pistons is coaxial. Such pairs of coaxial inboard and outboard cylinders and associated pistons may be referred to herein as corresponding pairs.

The brake system may be free of one or more corresponding pairs of cylinders and associated pistons. By way of example, the brake system may comprise only inboard cylinders and associated pistons. By way of another example, a corresponding pair of cylinders and associated pistons may be located in or proximate to a first portion of the caliper, and only an inboard cylinder and associated piston are located in or proximate to a second portion of the caliper. Other arrangements are contemplated by the present teachings.

Where a portion of the caliper is free of a corresponding pair of cylinders and associated pistons, the brake system may comprise a bridge portion. The bridge portion may function to transfer a load from an inboard side of the brake system to an outboard side of the brake system. The bridge portion may extend over the inner body portion and the outer body portion of the caliper.

A first end of the bridge portion may be coupled to a main body portion of the brake system or any other component coupled to the main body portion. The main body portion may be slidably coupled to the caliper. A second end of the bridge portion may be provided with one or more fingers. The fingers may function to engage a brake pad. The fingers may extend at an angle (e.g., about 90 degrees) from the bridge.

In an apply operation, a load may be applied to the pistons by either or both of an electromechanical actuation system and a hydraulic actuation system. Thus, the pistons may be caused to press a first brake pad against a rotor. Then, in reaction to this load, the bridge portion and fingers may be shifted axially inboard and the fingers may press a second brake pad against the rotor. The first brake pad may be an inboard brake pad and the second brake pad may be an outboard brake pad, or vice versa. In this regard, loads are applied to opposing sides of a rotor (i.e., a clamping action) to cause the rotor and/or the vehicle to slow and/or stop.

The electromechanical actuator system may comprise a motor gear unit. The motor gear unit may function to move a piston in an apply direction and/or a release direction. To this end, the motor gear unit may comprise an electrically driven motor and one or more linkages between the motor and one or more pistons, such that the motor drives the one or more linkages resulting in movement of the one or more pistons.

The motor gear unit may comprise a motor, one or more torque limiter assemblies, or both.

The motor gear unit may comprise a motor gear unit housing. The motor gear unit housing may function to protect the internal mechanism of the motor gear unit. The motor gear unit housing may contain a motor, one or more torque limiter assemblies, or both. The motor gear unit housing may be provided as one or more pieces located around the motor gear unit.

The motor gear unit may comprise a motor. The motor may function to actuate the piston in an apply direction (i.e., toward a rotor) and/or a release direction (i.e., away from the rotor). Non-limiting examples of suitable motors may include servo motors and stepper motors.

The motor gear unit may comprise a motor drive shaft. The motor drive shaft may be coupled to the motor. The motor drive shaft may extend a distance from the motor. The motor drive shaft may be provided with a motor drive gear disposed along its length.

The motor gear unit may comprise one or more motor drive gears. The motor drive gear may function to transfer torque, generated by the motor and provided to the motor drive shaft, to the torque limiter assemblies. The motor drive gear may mesh with one or more torque limiter drive gears of one or more torque limiter assemblies. Non-limiting examples of suitable motor drive gears may include a spur gear and a helical gear.

One or more other linkages may be disposed between the motor drive gear and the one or more torque limiter assemblies. The one or more other linkages may include one or more gears, shafts, chains, belts, the like, or any combination thereof. The physical dimensions and/or arrangement of the one or more other linkages may be selected to accommodate a packaging space of the brake system. By way of example, to package a motor over a main body portion and/or inner body portion of a caliper while maintaining a suitable clearance therefrom and/or from one or more torque limiter assemblies, one or more gears may be disposed between motor drive gear and one or more torque limiter assemblies. The present teachings contemplate any other suitable arrangement of linkages that can mechanically connect a motor to one or more torque limiter assemblies.

A helical gear and pinion gear may be disposed between the motor drive gear and the one or more torque limiter assemblies. The helical gear and pinion gear may share the same shaft. The helical gear and pinion gear may rotate in unison. The helical gear may mesh with the motor drive gear. The pinion may mesh with one or more torque limiter assemblies. The pinion may be a spur gear.

The electromechanical actuator system may comprise a spindle. The spindle may function to mechanically communicate with a torque limiter assembly, axially translate a nut in an apply direction and/or a release direction, or both. The spindle may be threaded on an outer peripheral surface thereof. The threads may be sized to receive balls.

The electromechanical actuator system may comprise a nut. The nut may function to move axially along the length of the spindle, engage the piston, move the piston in an apply direction and/or a release direction, or any combination thereof. The nut may be threaded on an inner peripheral surface thereof. The threads may be sized to receive balls.

The nut may be disposed over the spindle. A plurality of balls and/or one or more springs may be disposed within the threading of both the spindle and the nut. The balls may provide a low-friction engagement, relative to a direct threaded engagement of the nut to the spindle, of the nut to the spindle to aid in movement of the nut in the apply and/or release directions.

The nut and spindle described hereinbefore may cooperate as a ball screw mechanism. However, the present teachings contemplate that other spindle and nut arrangements, or other piston actuation mechanisms may be employed with the brake system.

The electromechanical actuator system may comprise one or more torque limiter assemblies. The torque limiter assemblies may function to asymmetrically actuate different pistons. The torque limiter assembly may be a ball-detent type torque limiter.

The electromechanical actuator system may comprise one or more portions. Each portion may actuate an individual piston. Preferably, two portions may be employed to actuate pistons that engage with two portions of a brake pad, although the present disclosure contemplates employing fewer or greater portions. Each portion may comprise a torque limiter assembly. A single torque limiter assembly may be associated with two or more portions and thus two or more pistons.

Each portion may be actuated by the same motor or a different motor. Preferably, each portion may be actuated by the same motor.

The torque limiter assembly may be set to a torque limit. Below the torque limit, a ring gear as described herein may remain rotationally captive and planetary gears may orbit around a sun gear. At and above the torque limit, a ring gear may rotate and planetary gears to remain orbitally captive relative to a sun gear. The ring gear may rotate by virtue of the balls slipping over peaks in the race of the ring gear and/or pre-loaded member. The ring gear may rotate relative to a pre-loaded member.

Upon one or more portions of an electromechanical actuation system realizing the torque limit, the torque limiter thereof may slip. At such time, one or more other portions of an electromechanical actuation system may continue to actuate a spindle until the torque limit is realized. Thus, any axial position discrepancy between the pistons of each of the portions of the electromechanical actuation system may be eliminated and the respective loads applied to different portions of brake pads may be generally uniform.

Where one or more pistons, by their engagement with one or more brake pads, meet the torque limit, the one or more pistons may cease to move (e.g., in the apply direction) and one or more other pistons may continue to move (e.g., in the apply direction), until they meet the torque limit, respectively.

The apply operation of the pistons may be held for a period of time. For example, a parking brake may be applied while a vehicle is left unoccupied. When the electromechanical actuation system is operated in the apply direction, the motor may operate until a pre-determined load applied to one or more brake pads is met. Then, the motor may cease to operate, and the load may be held until the electromechanical actuation system is disengaged and one or more pistons are caused to move in a release direction. The torque limit may apply in the release direction, while the load is held for a period of time.

The torque limit in the apply and/or release direction may be between about 5 Nm and 30 Nm, more preferably between about 10 Nm and 25 Nm, or even more preferably between about 15 Nm and 20 Nm.

The torque limit of one or more portions of the electromechanical actuation system may be the same as or different from the torque limit of one or more other portions of the electromechanical actuation system.

As discussed herein, a ring gear and/or a pre-loaded member may comprise a race with a jagged and/or undulating surface having a series of peaks and valleys, and balls locate within the race or races, between the ring gear and the pre-loaded member. Below the torque limit, the balls may be engaged within valleys of the jagged and/or undulating surface. At and above the torque limit, the balls slip over peaks of the jagged and/or undulating surface.

Each portion of the electromechanical actuation system may symmetrically act upon one or more pistons until resistance against at least one of the pistons cause the torque limit to be realized. At which time, the electromechanical actuation system may asymmetrically act upon the one or more pistons due to rotational freedom of the ring gear.

The torque limiter assembly may comprise a torque limiter drive shaft and a torque limiter drive gear. The torque limiter drive shaft may function to transfer torque, via a sun gear, to one or more planetary gears. The torque limiter drive gear may function to receive torque from one or more gears of the motor drive shaft and/or one or more other linkages. The torque limiter drive gear may be fastened to the torque limiter drive shaft (e.g., via a keyway). The torque limiter drive shaft may be integrally formed to the torque limiter drive shaft (e.g., by casting a splined drive shaft).

The torque limiter drive shaft may comprise a sun gear. The sun gear may function to transfer torque from the torque limiter drive shaft to one or more planetary gears. The sun gear may be disposed mechanically downstream of the torque limiter drive gear. The sun gear may be fastened to the torque limiter drive shaft (e.g., via a keyway). The sun gear may be integrally formed to the torque limiter drive shaft (e.g., by casting a splined drive shaft). The sun gear may be a spur gear. The sun gear may mesh with one or more planetary gears.

The torque limiter assembly may comprise one or more planetary gears. The planetary gears may function to selectively transfer torque from the torque limiter drive shaft to an output shaft. The planetary gears may orbit around a sun gear. The planetary gears may mesh with the sun gear and/or a ring gear. The planetary gears may be spur gears.

The torque limiter assembly may comprise a first plate carrier and/or a second plate carrier. The first and/or second plate carrier may function to translate orbital motion of planetary gears into torque provided to an output shaft. The first plate carrier may couple to the second plate carrier. The planetary gears may be fixed between the first and second plate carriers. The first plate carrier may be disposed on a first side of the planetary gears and the second plate carrier may be disposed on an opposing second side of the planetary gears.

The first plate carrier and/or the second plate carrier may comprise one or more shafts. Planetary gears may be located onto the shafts. The shafts may be distributed circumferentially around the first and/or second plate carrier. The planetary gears may rotate on the shafts.

One or more bushings may be located on the shafts, between the shafts and the planetary gears. The bushings may aid in the rotation of the planetary gears. The bushings may provide surfaces with lesser friction relative to a direct interface between the planetary gears and the shafts.

The first plate carrier or the second plate carrier may comprise an output shaft. The output shaft may be actuated by the orbital motion of one or more planetary gears. The output shaft may couple to a spindle. The output shaft may be splined and the spindle may comprise grooves that accept the splines, or vice versa.

The torque limiter assembly may comprise a ring gear. The ring gear may function to selectively rotate such that orbit of the planetary gears may be provided for or precluded. The ring gear may be an internal gear. The ring gear may mesh with one or more planetary gears.

When the ring gear is rotationally captive, the planetary gears may orbit around the sun gear, When the ring gear is rotationally free, torque provided to the planetary gears by the sun gear may be transferred to the ring gear and the planetary gears may become orbitally captive. Thus, the torque limit may be met when the ring gear transitions from being rotationally captive to rotationally free.

The ring gear may be rotationally captive when balls are engaged within valleys of the race of the ring gear. The ring gear may be rotationally free when balls slip over peaks of the race of the ring gear.

The torque limiter assembly may comprise a pre-loaded member. The pre-loaded member may function to apply a pre-determined force upon balls, retain balls between the pre-loaded member and the ring gear, or both.

The pre-loaded member may comprise a groove. The groove may function to receive a portion of a spring. The groove may be located on a first end of the pre-loaded member opposing a second end, the second end comprising a race and being proximate to the ring gear.

The torque limiter assembly may comprise a spring. The spring may function to apply a force to the pre-loaded member in the direction of the balls and/or the ring gear. The spring may be circumferentially aligned with a first race of the ring gear and a second race of the pre-loaded member. The spring may have a first end that engages the pre-loaded member and a second end that engages a spring retainer.

The force applied to the pre-loaded member may determine the torque limit. The force may be modulated by selecting springs having different spring rates, changing the pre-compression of the spring (e.g., by changing the distance between a pre-loaded member and spring retainer), or both. The pre-load of the spring may be fixed or adjustable. The pre-load of the spring may be actively adjusted.

The spring may be a coil spring, a washer spring, a spring stack, an elastic element, the like, or any combination thereof.

The torque limiter assembly may comprise a spring retainer. The spring retaining member may function to pre-load the spring. The spring retainer may be a snap ring. The snap ring may engage an internal surface of the motor gear unit housing. For example, the snap ring may fit into a groove formed in the internal surface of the motor gear unit housing. The spring retainer may be integrally formed with the motor gear unit housing such as by molding, casting, machining, or any combination thereof.

The ring gear may comprise a first race. The first race may function to receive balls, set a torque limit, or both. The first race may extend circumferentially around the ring gear.

The pre-loaded member may comprise a second race. The second race may function to receive balls, set a torque limit, or both. The second race may extend circumferentially around the pre-loaded member.

The torque limiter assembly may comprise one or more balls. The balls may function to selectively captivate the ring gear. At least a portion of the balls may be located within the first and/or second race. The balls may be disposed between the first race of the ring gear and the second race of the pre-loaded member.

The first race and/or the second race may comprise an undulating surface and/or jagged surface. The undulating surface and jagged surface may comprise peaks and valleys. Balls may reside captive within valleys until a torque limit is realized. Upon the torque limit being realized or exceeded, the balls may slip over the peaks.

The height of the peaks, measured from the valleys, may determine the torque limit. The balls may travel the height up the slopes before reaching the peak and slipping into the next valley. As the balls traverse the height, the spring may be compressed.

Slopes may extend between the peaks and valleys. The slopes may be defined by an angle and/or curvature. A first portion of the slopes may be defined by an angle and a second portion of the slopes may be defined by a curvature.

The angle of the slopes may determine the torque limit. The angle of the slopes may be between about 5° and about 45°, more preferably between about 10° and about 45°, more preferably between about 15° and about 40°, or even more preferably between 20° and about 35°. Different portions of slopes oriented in the same direction (i.e., apply or release direction), may be defined by different angles or the same angle. One or more slopes oriented in the same rotational direction may be defined by different angles or the same angle. Rotational direction, as referred to herein with respect to the race, may mean a clockwise or counterclockwise direction in which the balls travel with respect to the race. The apply operation may involve clockwise rotation, the release operation may involve counterclockwise rotation, or vice versa.

The curvature of the slopes may determine the torque limit. One or more slopes oriented in the same rotational direction may be defined by different curvatures or the same curvature.

The angle and/or curvature of the slopes over which the balls travel in the release direction may be the same as the angle and/or curvature of the slopes over which the balls travel in the apply direction. In this regard, the torque limit in the release direction may be equal to the torque limit in the apply direction.

The angle and/or curvature of the slopes over which the balls travel in the release direction may be different from the angle and/or curvature of the slopes over which the balls travel in the apply direction. In this regard, the torque limit in the release direction may be greater than the torque limit in the apply direction.

The angle and/or curvature of the slopes over which the balls travel in the release direction may greater than the angle and/or curvature of the slopes over which the balls travel in the apply direction by about 2% or more, more preferably about 5% or more, or even more preferably about 10% or more. The angle and/or curvature of the slopes over which the balls travel in the release direction may greater than the angle and/or curvature of the slopes over which the balls travel in the apply direction by about 25% or less, more preferably about 20% or less, or even more preferably about 15% or less.

The explanations and illustrations presented herein are intended to acquaint others skilled in the art with the invention, its principles, and its practical application. Those skilled in the art may adapt and apply the invention in its numerous forms, as may be best suited to the requirements of a particular use.

It is understood that the above description is intended to be illustrative and not restrictive. Many embodiments as well as many applications besides the examples provided will be apparent to those of skill in the art upon reading the above description.

Other combinations are also possible as will be gleaned from the following claims, which are also hereby incorporated by reference into this written description.

The scope of the invention should, therefore, be determined not with reference to the above description, but should instead be determined with reference to the appended claims, along with the full scope of equivalents to which such claims are entitled.

The omission in the following claims of any aspect of subject matter that is disclosed herein is not a disclaimer of such subject matter, nor should it be regarded that the inventors did not consider such subject matter to be part of the disclosed inventive subject matter.

Plural elements can be provided by a single integrated element. Alternatively, a single element might be divided into separate plural elements.

The disclosure of "a" or "one" to describe an element is not intended to foreclose additional elements.

While the terms first, second, third, etc., may be used herein to describe various elements, components, regions, and/or sections, these elements, components, regions, and/or sections should not be limited by these terms. These terms may be used to distinguish one element, component, region, and/or section from another element, component, region, and/or section. Terms such as "first," "second," and other numerical terms when used herein do not imply a sequence or order unless clearly indicated by the context. Thus, a first element, component, region, and/or section discussed above or below could be termed a second element, component, region, and/or section without departing from the present teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater.

The use of "about" or "approximately" in connection with a range applies to both ends of the range. Thus, "about 20 to 30" is intended to cover "about 20 to about 30", inclusive of at least the specified endpoints.

Unless otherwise stated, any numerical values recited herein include all values from the lower value to the upper value in increments of one unit provided that there is a separation of at least 2 units between any lower value and any higher value. As an example, if it is stated that a value is, for example, from 1 to 90, from 20 to 80, or from 30 to 70, it is intended that intermediate range values such as (e.g., 15 to 85, 22 to 68, 43 to 51, 30 to 32, etc.) are within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints.

The term "consisting essentially of" to describe a combination shall include the elements or components identified, and such other elements or components that do not materially affect the basic and novel characteristics of the combination. The use of the terms "comprising" or "including" to describe combinations of elements or components herein also contemplates embodiments that consist essentially of the elements or components.

The disclosures of all articles and references, including patent applications and publications, are incorporated by reference for all purposes.

REFERENCE NUMERALS

10 Brake system
12 Caliper
14 Inner body portion
16 Outer body portion
18 Bridge portion
20 Main body portion
22 Finger
24 Pair of brake pads
26 Inner brake pad
28 Outer brake pad
30 Cylinder
32 Piston
34 Electromechanical actuation system
36 Spindle
38 Nut
40 Fluid
42 Motor gear unit
44 Motor gear unit housing
46 Motor
48 Torque limiter assembly
50 Motor drive shaft
52 Motor drive gear
54 Helical gear
56 Pinion
58 Torque limiter drive gear
60 Torque limiter drive shaft
62 Ring gear
64 Pre-loaded member
66 Spring
68 Spring retainer
70 Planetary gear
72 Sun gear
74 First plate carrier
76 Second plate carrier
78 Shafts
80 Bushing
82 Output shaft
84 Balls
86 First race
88 Second race
90 Groove
92 Undulating surface
94 Peak
96 Valley
98 Slope

What is claimed is:

1. A brake system comprising:
an electromechanical actuation system comprising at least a first portion and a second portion, each of the first and second portions comprising:
a torque limiter assembly setting a torque limit and comprising:
a planetary gear meshed with a sun gear,
a ring gear meshed with the planetary gear and comprising a first race extending circumferentially therearound,
a pre-loaded member comprising a second race extending circumferentially therearound, and
balls engaged between the first race and the second race;
wherein the first race and/or the second race comprises a series of peaks and valleys, and slopes extending therebetween;
wherein below the torque limit, the balls are engaged within the valleys causing the ring gear to remain rotationally captive and the planetary gear to orbit around the sun gear; and
wherein at and above the torque limit, the balls slip over the peaks, causing the ring gear to rotate and the planetary gear to remain orbitally captive.

2. The brake system according to claim 1, wherein an angle of the slopes determines the torque limit, at least in part; and wherein the angle of the slopes is between about 5° and about 45°.

3. The brake system according to claim 2, wherein the angle of the slopes over which the balls travel in a release direction is the same as or different from the angle of the slopes over which the balls travel in an apply direction.

4. The brake system according to claim 3, wherein the angle of the slopes over which the balls travel in the release direction is between about 2% and 25% greater than the angle of the slopes over which the balls travel in the apply direction.

5. The brake system according to claim 1, wherein the torque limiter assembly comprises:
a spring generally circumferentially aligned with the first and second races and applying a force upon the pre-loaded member such that the balls are compressed between the pre-loaded member and the ring gear.

6. The brake system according to claim 5, wherein a height of the peaks, measured from the valleys, determines the torque limit, at least in part.

7. The brake system according to claim 1, wherein the peaks, valleys, and slopes are defined by an undulating surface, a jagged surface, or both.

8. The brake system according to claim 1, wherein each of the first and second portions of the electromechanical actuation system comprises:
a first plate carrier engaging a first side of the planetary gear such that orbit of the planetary gear causes the first plate carrier to rotate, and
a second plate carrier engaging a second side of the planetary gear such that orbit of the planetary gear causes the second plate carrier to rotate, the second side opposing the first side.

9. The brake system according to claim 8, wherein the first or second plate carrier comprises an output shaft that mechanically cooperates with a spindle; wherein the spindle cooperates with a nut as a ball screw mechanism; and wherein the nut engages a piston.

10. The brake system according to claim 9, wherein rotation of the spindle ultimately causes the piston to axially translate in an apply direction and/or a release direction.

11. The brake system according to claim 1, wherein the torque limit of the first portion is different from the torque limit of the second portion.

12. The brake system according to claim 1, wherein both of the first and second portions of the electromechanical actuation system are actuated by the same motor.

13. The brake system according to claim 1, wherein the brake system comprises a caliper comprising an inner body portion and an outer body portion; and
wherein a bridge extends between the inner body portion and the outer body portion; and wherein the bridge comprises one or more fingers that act upon a brake pad associated with the outer body portion.

14. The brake system according to claim 13, wherein the brake system comprises two or more pistons located entirely on the inner body portion or the outer body portion, or located on both of the inner body portion and the outer body portion; and
  wherein each of the first and second portions of the electromechanical actuation system are associated with each of the two or more pistons.

15. The brake system according to claim 14, wherein each of the first and second portions of the electromechanical actuation system symmetrically acts upon the two or more pistons until resistance against at least one of the two or more pistons causes the torque limit to be realized, at which time the electromechanical actuation system asymmetrically acts upon the two or more pistons due to rotational freedom of the ring gear.

16. An electromechanical actuation system for a vehicle brake, the system comprising:
  a nut and a spindle, wherein rotation of the spindle actuates the nut in an apply direction and a release direction;
  a motor mechanically communicating with the spindle; and
  a torque limiter assembly disposed mechanically downstream of the motor and mechanically upstream of the spindle, and comprising a planetary gear a sun gear and a ring gear the planetary gear being meshed with both the sun gear and the ring gear;
  wherein the torque limiter assembly is set to a torque limit, below which rotational movement is delivered to the spindle and above which no rotational movement is delivered to the spindle;
  wherein below the torque limit the ring gear remains rotationally captive and the planetary gear orbits around the sun gear; and
  wherein at and above the torque limit, the ring gear rotates and the planetary gear remains orbitally captive.

17. The electromechanical actuation system according to claim 16, wherein the torque limiter assembly is a ball-detent type torque limiter.

18. The electromechanical actuation system according to claim 17, wherein the ring gear comprises a race having a series of peaks and valleys, and slopes extending therebetween; and the electromechanical actuation system comprises balls engaged with the race; wherein below the torque limit, the balls are engaged within the valleys; and wherein at and above the torque limit, the balls slip over the peaks.

19. The electromechanical actuation system according to claim 16, wherein the electromechanical actuation system comprises two or more portions, each portion associated with a separate piston for engaging a brake pad; and wherein each of the two or more portion is provided with the torque limiter assembly.

* * * * *